United States Patent
Oishi

(10) Patent No.: US 8,514,442 B2
(45) Date of Patent: Aug. 20, 2013

(54) DATA MANAGEMENT DEVICE AND DATA MANAGEMENT METHOD, AND COMPUTER READABLE MEDIUM THEREFOR

(75) Inventor: Minoru Oishi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 724 days.

(21) Appl. No.: 12/748,073

(22) Filed: Mar. 26, 2010

(65) Prior Publication Data

US 2010/0245881 A1     Sep. 30, 2010

(30) Foreign Application Priority Data

Mar. 28, 2009   (JP) ................... 2009-080686

(51) Int. Cl.
*G06F 3/048* (2013.01)
*G06F 3/12* (2006.01)

(52) U.S. Cl.
USPC ............ 358/1.16; 358/1.15; 715/769; 710/8; 399/81

(58) Field of Classification Search
USPC ............... 358/1.15, 1.16; 399/81; 715/769; 710/8
See application file for complete search history.

(56) References Cited

U.S. PATENT DOCUMENTS

| 5,745,112 | A | * | 4/1998 | Hirose | 715/769 |
| 5,930,552 | A | * | 7/1999 | Ikeda | 399/8 |
| 5,950,045 | A | * | 9/1999 | Nomura et al. | 399/81 |
| 7,990,580 | B2 | * | 8/2011 | Motoyoshi | 358/403 |
| 2002/0021310 | A1 | * | 2/2002 | Nakai et al. | 345/837 |

FOREIGN PATENT DOCUMENTS

| JP | H08-202607 A | 8/1996 |
| JP | 2008-099059 A | 4/2008 |

* cited by examiner

*Primary Examiner* — King Poon
*Assistant Examiner* — Lawrence Wills
(74) *Attorney, Agent, or Firm* — Baker Botts L.L.P.

(57) ABSTRACT

A data management device displays, on a display screen thereof, an external-device image representing an external device and an application screen corresponding to each of applications in execution. The external-device image includes function areas that respectively represent functional units of the external device. The data management device is configured to determine in which, among the function areas, a first position specified on the display screen is included, determine in which, among display areas for the application screens and the external-device image, a second position specified on the display screen is included, and set data corresponding to a function represented by a function area in which the first position is determined to be included, as target data for a process corresponding to a display area in which the second position is determined to be included.

27 Claims, 5 Drawing Sheets

MEDIUM DRIVE

SCANNING UNIT

FAX UNIT

Figure 1:
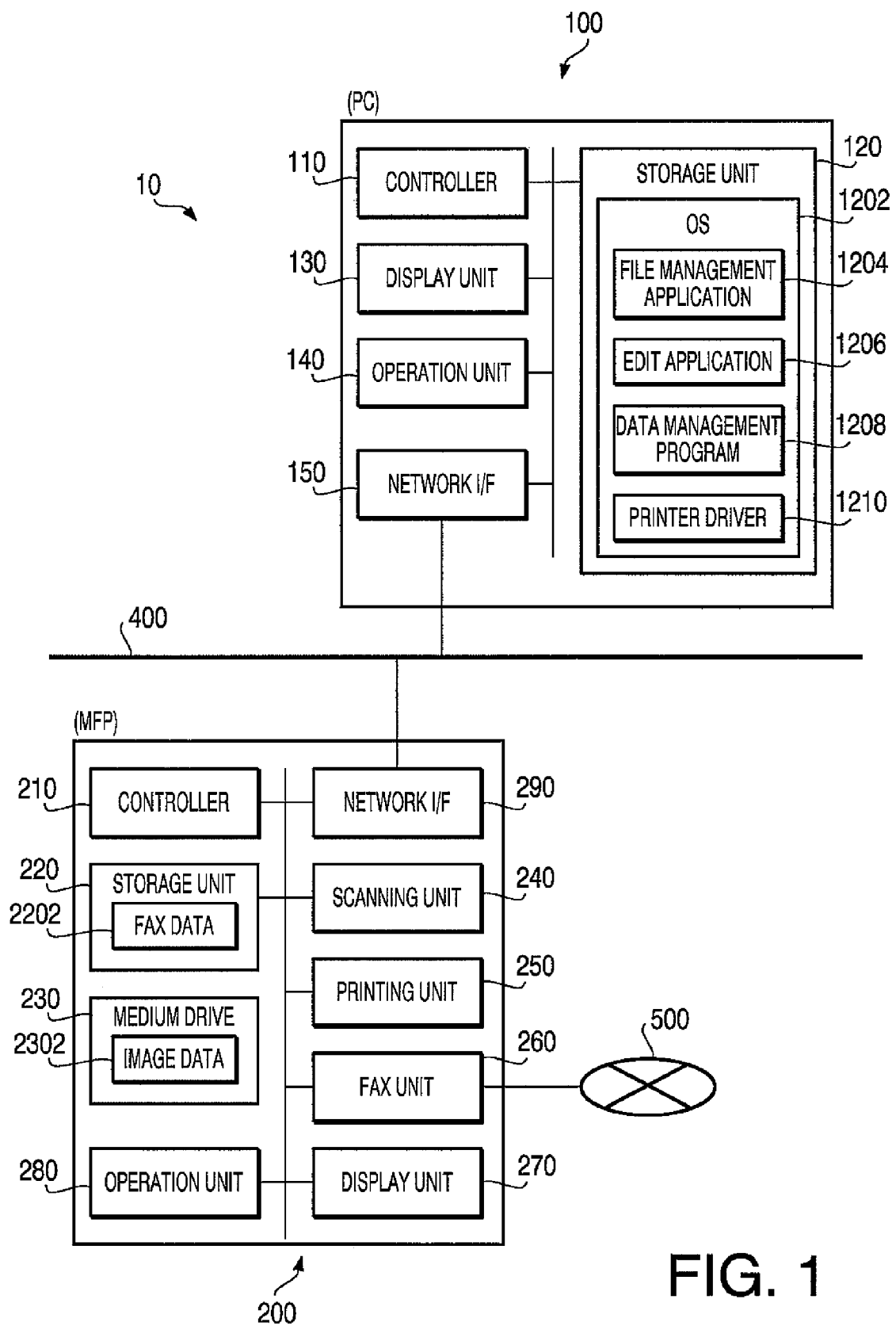

DATA MANAGEMENT DEVICE AND DATA MANAGEMENT METHOD, AND COMPUTER READABLE MEDIUM THEREFOR

CROSS-REFERENCE TO RELATED APPLICATION

This application claims priority under 35 U.S.C. §119 from Japanese Patent Application No. 2009-080686 filed on Mar. 28, 2009. The entire subject matter of the application is incorporated herein by reference.

BACKGROUND

1. Technical Field

The following description relates to one or more data management techniques for managing data to be treated by an external device.

2. Related Art

Techniques for managing electronic data have been proposed. In an example of the techniques, document image data, which is acquired and digitized by an image reader such as an image scanner or created by a general application program, is filed with an identification number attached thereto when stored in a classification folder. In addition, when stored in a different folder, the document image data is transmitted via facsimile to a destination corresponding to the different folder. Moreover, when stored in another different folder, the document image data is transmitted via e-mail to a predetermined user.

Furthermore, the following technique has been proposed that is employed for an image processing system in which an image processing device having a scanner driver and an application installed therein is connected with an image scanner. In the technique, the scanner driver transmits, to the application, image data scanned by the image scanner in accordance with a reading request issued by the application. Further, when the reading request from the application is for reading an image of a format that the image scanner does not support, the scanner driver converts the scanned image data into image data of a format conforming to the reading request.

SUMMARY

As an example of devices that generate and treat electronic data, cited is a device that has multiple functions such as a scanner function, a facsimile function, a printer function, a copy function, and functions attained by applying the aforementioned functions. Such a device serves as an external device utilizable by a computer.

Aspects of the present invention are advantageous to provide one or more improved techniques that make it possible to manage data to be treated by an external device having multiple functions.

According to aspects of the present invention, a data management device is provided which is configured to manage data that an external device generates or stores therein. The external device includes functional units that respectively realize multiple functions of the external device and stores data corresponding to each of the functions. The data management device includes a display unit configured to display, on a display screen thereof, an external-device image representing the external device and an application screen corresponding to each of applications in execution on the data management device, the external-device image comprising function areas that respectively represent the functional units, a first storing unit configured to store first positional information on a position of each of the function areas on the display screen, a first position setting unit configured to set a position specified on the display screen as a first position, a first determining unit configured to determine in which, among the function areas, the first position is included, based on the first positional information, a second position setting unit configured to set a position specified on the display screen as a second position, a second storing unit configured to store second positional information on a position of each of respective display areas for the application screens and the external-device image on the display screen, a second determining unit configured to determine in which, among the display areas, the second position is included, based on the second positional information, and a data setting unit configured to set data corresponding to a function represented by one, of the function areas, in which the first position is determined to be included, as target data to be processed in a process corresponding to one, of the display areas, in which the second position is determined to be included.

In some aspects of the present invention, the data management device configured as above can easily render the first and second positions, which are specified on the display screen of the data management device, corresponding to an intended function area and an intended display area, respectively. Therefore, the data management device can in a user-friendly manner set data corresponding to an intended function of the external device, as target data to be processed in a desired process. Thus, in some aspects of the present invention, the data management device is provided that makes it possible to manage data to be treated by the external device having the multiple functions.

According to aspects of the present invention, further provided is a data management method adapted to be implemented on a processor to manage data that an external device generates or stores therein. The external device includes functional unit that respectively realize multiple functions of the external device and stores data corresponding to each of the functions. The data management method includes a display step of displaying, on a display screen of the processor, an external-device image representing the external device and an application screen corresponding to each of applications in execution on the processor, the external-device image comprising function areas that respectively represent the functional units, a first storing step of storing first positional information on a position of each of the function areas on the display screen, a first position setting step of setting a position specified on the display screen as a first position, a first determining step of determining in which, among the function areas, the first position is included, based on the first positional information, a second position setting step of setting a position specified on the display screen as a second position, a second storing step of storing second positional information on a position of each of respective display areas for the application screens and the external-device image on the display screen, a second determining step of determining in which, among the display areas, the second position is included, based on the second positional information, and a data setting step of setting data corresponding to a function represented by one, of the function areas, in which the first position is determined to be included, as target data to be processed in a process corresponding to one, of the display areas, in which the second position is determined to be included.

In some aspects of the present invention, the data management method adapted as above can provide the same effects as the aforementioned data management device.

According to aspects of the present invention, further provided is a computer readable medium storing computer readable instructions for managing data that an external device generates or stores therein. The external device includes functional units which respectively realize multiple functions of the external device and stores data corresponding to each of the functions. When executed by a processor, the instructions cause the processor to perform a display step of displaying, on a display screen of the processor, an external-device image representing the external device and an application screen corresponding to each of applications in execution on the processor, the external-device image comprising function areas that respectively represent the functional units, a first storing step of storing first positional information on a position of each of the function areas on the display screen, a first position setting step of setting a position specified on the display screen as a first position, a first determining step of determining in which, among the function areas, the first position is included, based on the first positional information, a second position setting step of setting a position specified on the display screen as a second position, a second storing step of storing second positional information on a position of each of respective display areas for the application screens and the external-device image on the display screen, a second determining step of determining in which, among the display areas, the second position is included, based on the second positional information, and a data setting step of setting data corresponding to a function represented by one, of the function areas, in which the first position is determined to be included, as target data to be processed in a process corresponding to one, of the display areas, in which the second position is determined to be included.

In some aspects of the present invention, the computer readable medium configured as above can provide the same effects as the aforementioned data management device and method.

BRIEF DESCRIPTION OF THE ACCOMPANYING DRAWINGS

FIG. 1 schematically shows a configuration of a multi-function peripheral (MFP) system in an embodiment according to one or more aspects of the present invention.

Figure 2:
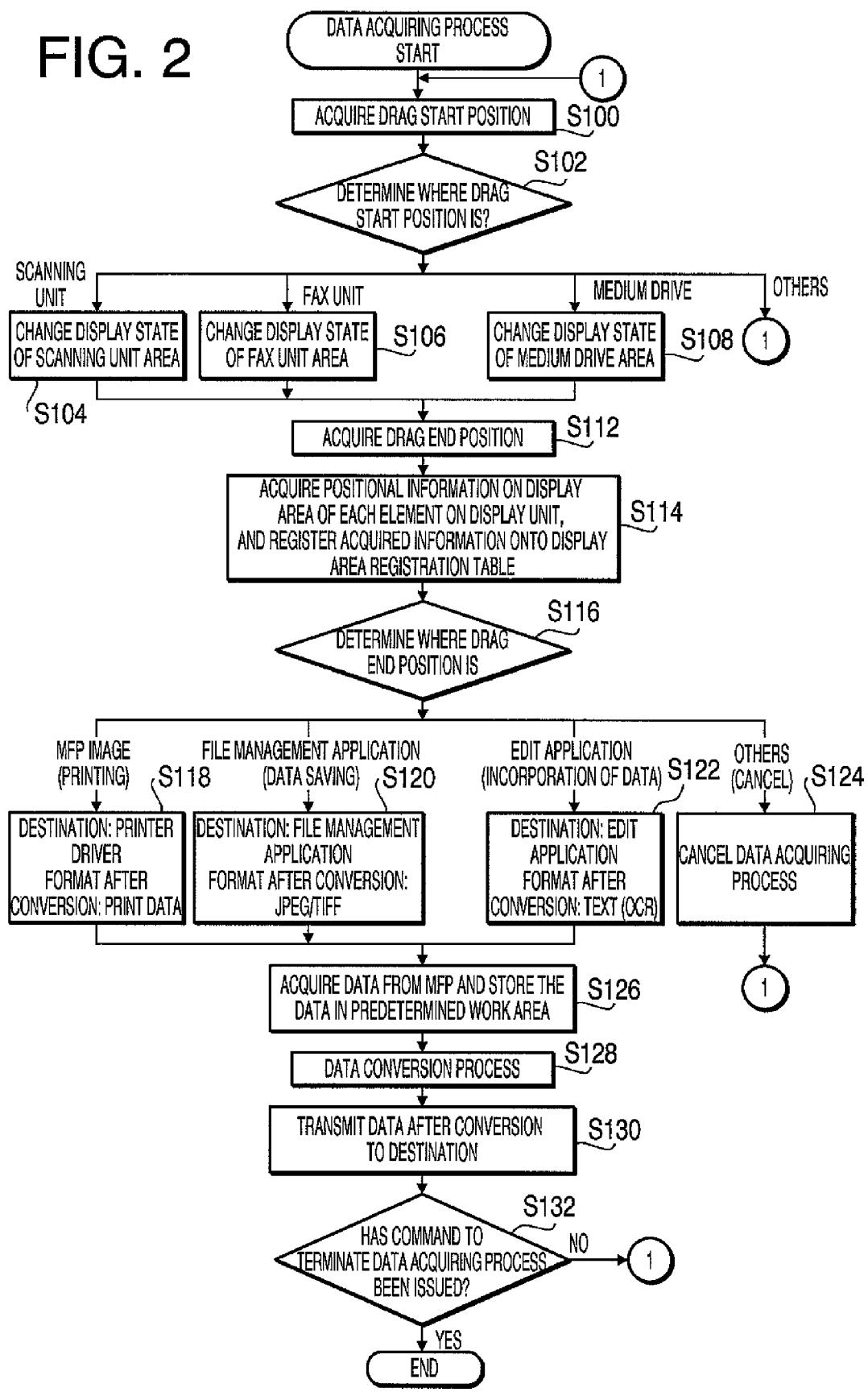

FIG. 2 is a flowchart showing a procedure of a data acquiring process to be executed by a computer of the MFP system in the embodiment according to one or more aspects of the present invention.

Figure 3:
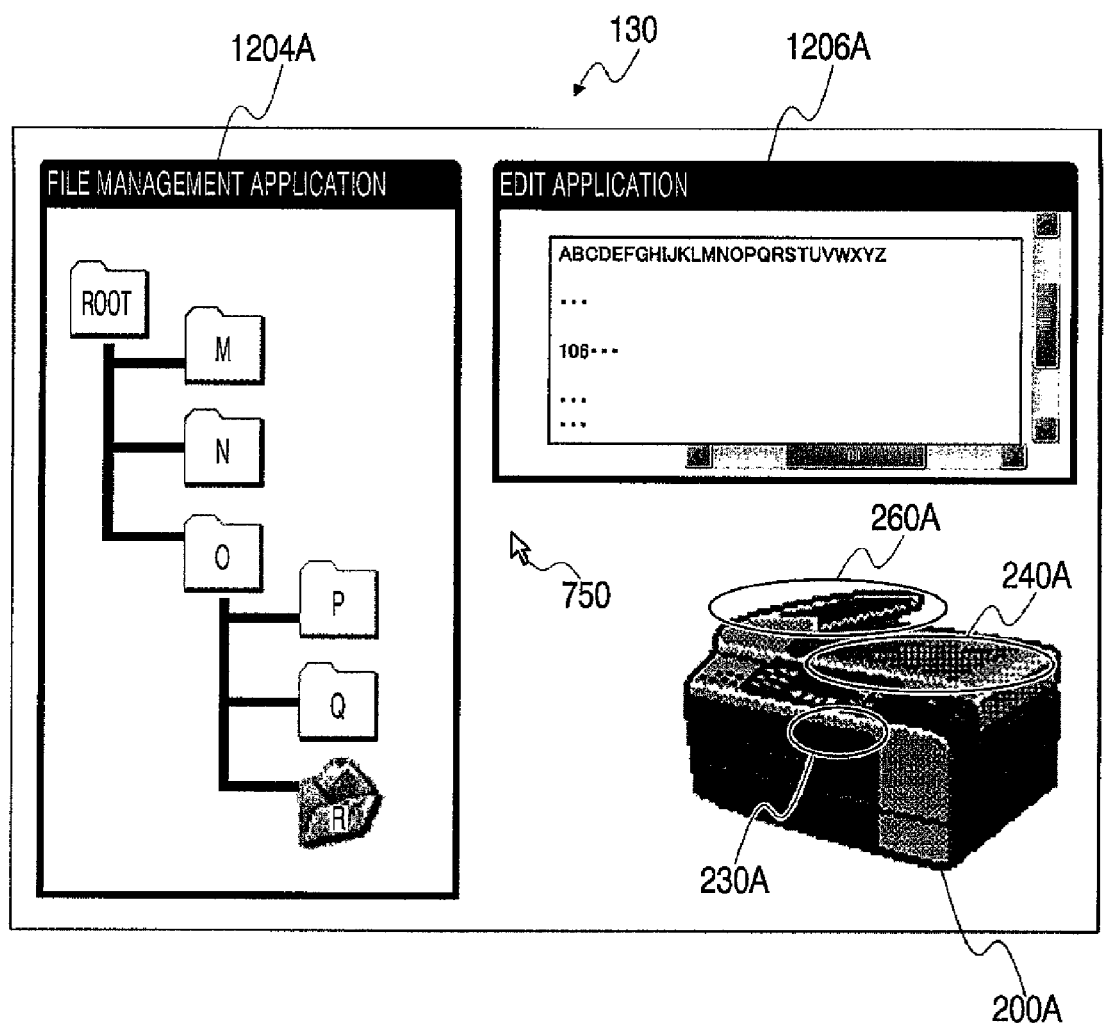

FIG. 3 exemplifies a screen image displayed on a display unit of the computer during the data acquiring process in the embodiment according to one or more aspects of the present invention.

Figure 4:
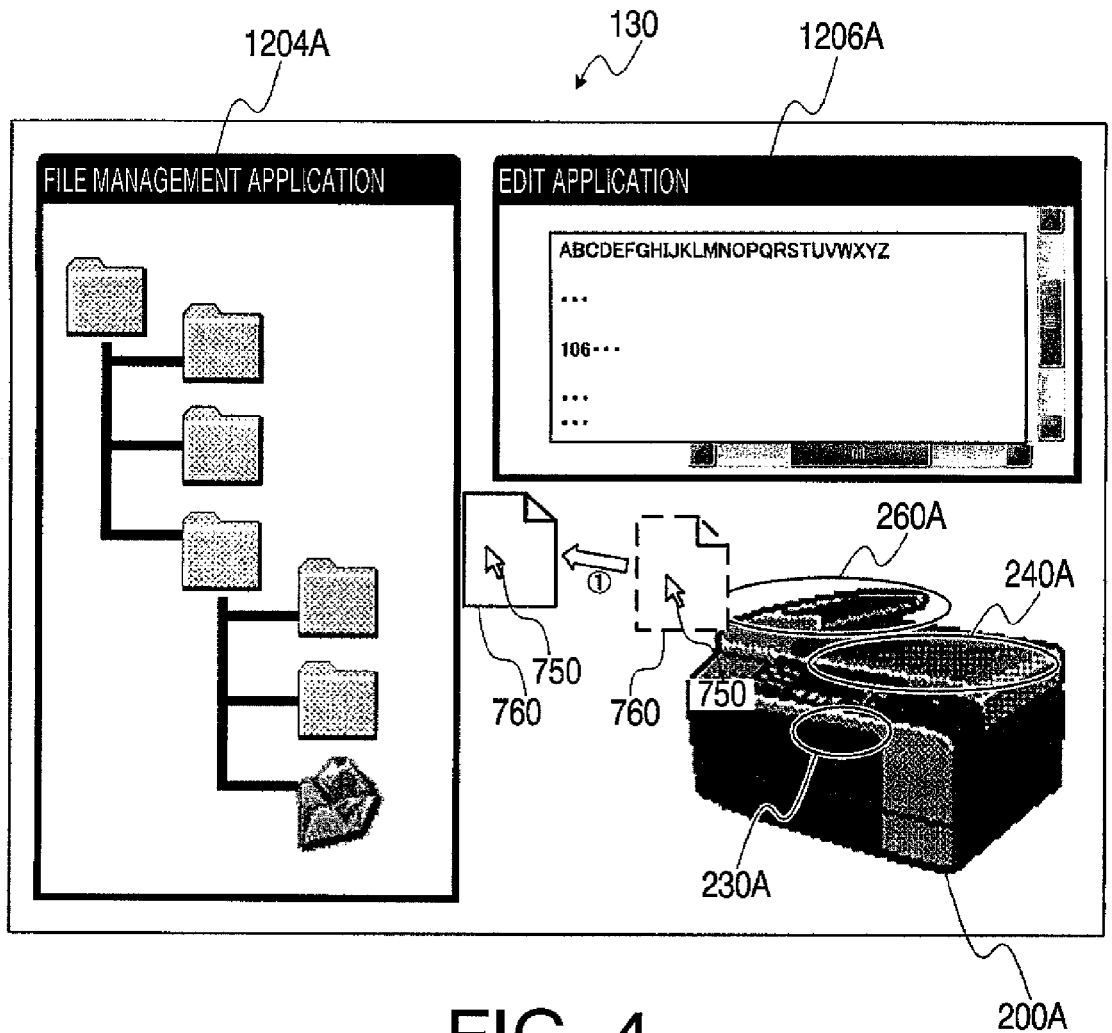

FIG. 4 illustrates a data icon moving on the display unit in the data acquiring process in the embodiment according to one or more aspects of the present invention.

Figure 5A:
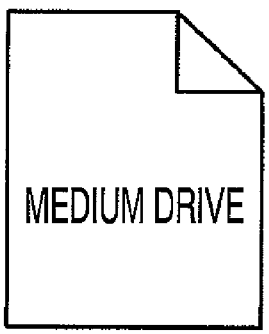
Figure 5B:
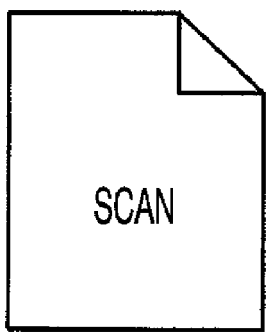
Figure 5C:
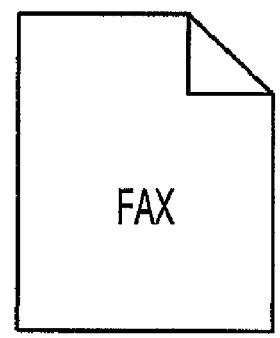

FIGS. 5A to 5C exemplifies respective data icons corresponding to functions provided to the MFP in the embodiment according to one or more aspects of the present invention.

Figure 6:
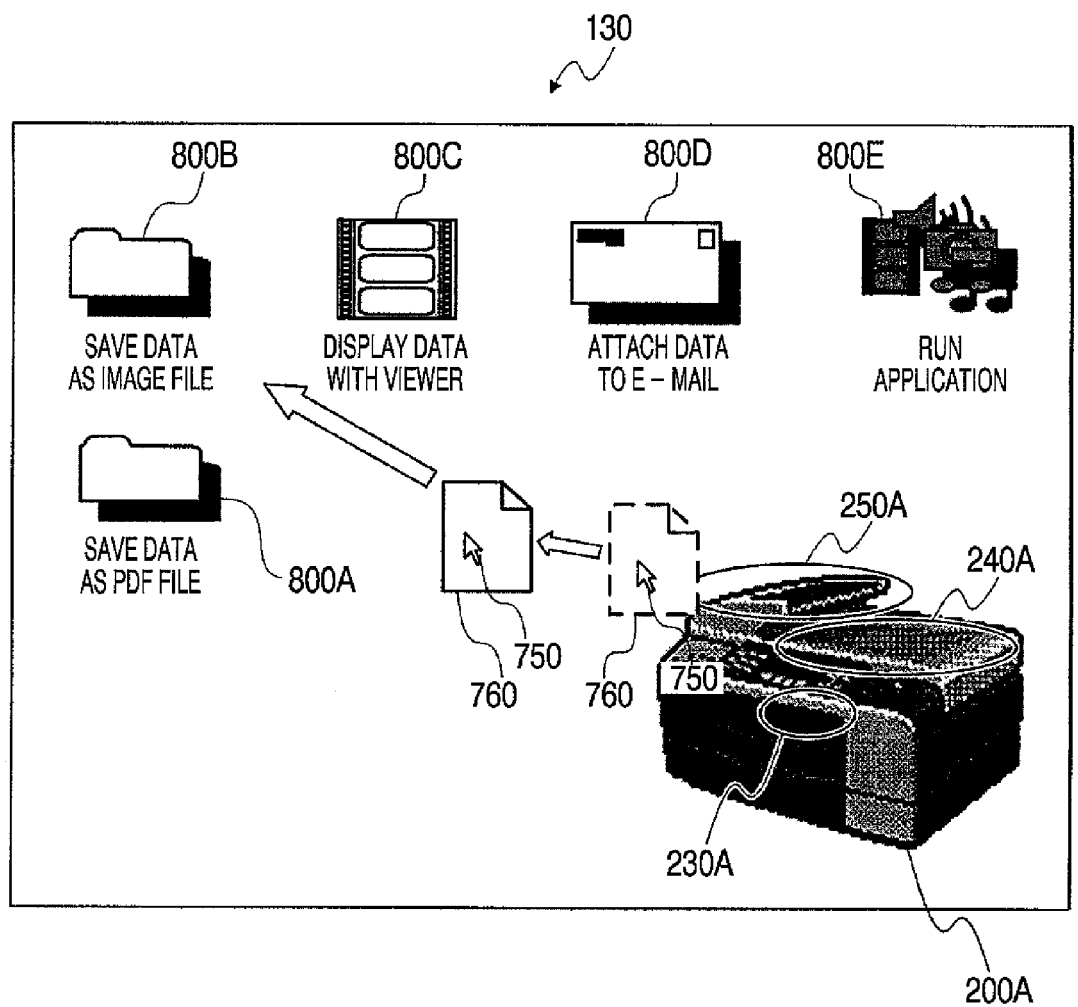

FIG. 6 exemplifies a screen image displayed on the display unit of the computer during a data acquiring process in a modification according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an embodiment according to aspects of the present invention will be described with reference to the accompany drawings.

(Configuration of System)

A multi-function peripheral (MFP) system 10 will be described with reference to FIG. 1. As illustrated in FIG. 1, the MFP system 10 includes a personal computer (PC) 100 and an MFP 200. The PC 100 and the MFP 200 are interconnected via a local area network (LAN) 400 so as to perform data communication therebetween. The MFP 200 is configured to receive print data from the PC 100 and perform a printing operation based on the print data. Further, the MFP 200 is configured to transmit, to the PC 100, scanned data generated through a scanning operation based on a scan request from the PC 100. It is noted that the scanned data may temporarily be stored on a RAM included in a controller 210 of the MFP 200. Moreover, the MFP 200 is configured to transmit, to the PC 100, facsimile data received from a facsimile machine via a public line network, as well as the scanned data.

Hereinafter, a configuration of each of the PC 100 and the MFP 200 will be set forth. The PC 100 includes a controller 110, a storage unit 120, a display unit 130, an operation unit 140, and a network interface (I/F) 150. The controller 110 is configured with a CPU, a ROM, and a RAM, so as to take overall control of the PC 100.

The storage unit 120 may be configured with a hard disk drive (HDD). The storage unit 120 has an operating system (OS) 1202 and a file management application 1204 installed thereon. The OS 1202 may be Microsoft Windows (trademark registered). The file management application 1204, which is configured to manage various files (various kinds of data, not shown) stored on the storage unit 120, may be Microsoft Explorer (trademark registered). Further, the storage unit 120 has edit applications 1206 installed thereon, such as word-processor software, spreadsheet software, and presentation software. Additionally, the storage unit 120 has a data management program 1208 installed thereon for a below-mentioned data acquiring process. Moreover, the storage unit 120 has various driver programs (not shown) installed thereon, as well as a printer driver 1210 for controlling a printing unit 250 of the MFP 200.

The display unit 130 is configured to display various kinds of information. The operation unit 140 is configured, e.g., with a keyboard and a mouse, so as to serve as an interface for accepting therethrough various commands applied to execution of the aforementioned programs (applications) 1202, 1204, 1206, and 1208. The network I/F 150 is configured to connect the PC 100 with the LAN 400 and achieve data communication with external devices such as the MFP 200 via the LAN 400.

When the CPU of the controller 110 executes, on the RAM, programs stored on the ROM and the programs 1202, 1204, 1206, and 1208 stored on the storage unit 120, e.g., in accordance with commands input via the operation unit 140, various processes are executed and thereby various functions are attained.

Subsequently, the MFP 200 will be explained. The MFP 200 includes a controller 210, a storage unit 220, a medium drive 230, a scanning unit 240, a printing unit 250, a facsimile unit 260, a display unit 270, an operation unit 280, and a network I/F 290.

The controller 210, which takes overall control of the MFP 200, is configured with a CPU performing arithmetic operations, a ROM storing various programs, and a RAM serving as a work area. The storage unit 220 is configured, e.g., with a hard disk drive (HDD) or a non-volatile memory such as an NVRAM, so as to store thereon facsimile data 2202 received by the facsimile unit 260. The facsimile data 2202 may include data of the bitmap (BMP) format.

When the CPU of the controller 110 executes the programs stored on the ROM, the MFP 200 performs various processes. At that time, various kinds of data such as data stored on the storage unit 120 is input and held on the RAM. The CPU accesses the RAM to carry out processes using the data held on the RAM.

The medium drive 230 is configured to have a medium (e.g., a memory card and a USB memory, hereinafter an explanation will be provided under an assumption that the medium is a memory card) attached thereto. On the memory card attached to the medium drive 230, the scanned data generated by the scanning unit 240 is stored as image data 2302. The image data 2302 may include data of the bitmap (BMP) format.

The scanning unit 240 scans a document sheet placed on a document table (not shown). The printing unit 250 performs a printing operation based on print data transmitted by the PC 100. The printing unit 250 realizes a copy function in collaboration with the scanning unit 240. The facsimile unit 260 is configured to connect the MFP 200 with the public line network 500 and enable facsimile communication with other facsimile machines.

The display unit 270 is configured to display various kinds of information. The operation unit 280 is configured, e.g., with direction keys, a numeric keypad for accepting inputs of numerical characters, and a return key, so as to serve as an interface for accepting various commands therethrough. The network I/F 290 is configured to connect the MFP 200 with the LAN 400 and enable data communication with external devices such as the PC 100.

(Data Retrieving Process)

The data acquiring process, executed by the controller 110 of the PC 100, is a process to operate data (files) generated and stored on the side of the MFP 200 and to instruct the MFP 200 to perform a predetermined function. For example, when a user issues an instruction to launch the data acquiring process via the operation unit 140 and the controller 110 acquires the instruction, the data acquiring process is started. The controller 110 of the PC 100 performs the data acquiring process by running the data management program 1208 stored on the storage unit 120.

The data acquiring process will be described with reference to FIGS. 2 to 5. After launching the data acquiring process, the controller 110 displays an MFP image 200A representing the MFP 200 on the display unit 130 in a manner as shown in FIG. 3. In a state where a screen shown in FIG. 3 is displayed on the display unit 130, the user has launched the file management application 1204 stored on the storage unit 120, and a file management application screen 1024A is displayed on the display unit 130 in response to the launch of the file management application 1204. In addition, the user has launched the edit application 1206 stored on the storage unit 120, and an edit application screen 1206A is displayed on the display unit 130 in response to the launch of the edit application 1206. Further, on the display unit 130, a pointer 750 is displayed which moves within a display screen of the display unit 130 in response to operation of the mouse included in the operation unit 140.

After launching the data acquiring process, prior to execution of the steps beginning with S100, the controller 110 registers (stores) positional information on a display area of the MFP image 200A on the display unit 130 onto an MFP image registration table, e.g., in a predetermined area on the RAM or a predetermined area on the storage unit 120. Specifically, the controller 110 registers, onto the MFP image registration table, positional information on a medium drive area 230A, a scanning unit area 240A, and a facsimile unit area 260A that represent the medium drive 230, the scanning unit 240, and the facsimile unit 260 in the MFP image 200A, in association with the medium drive 230, the scanning unit 240, and the facsimile unit 260, respectively. It is noted that when the MFP image 200A is always displayed in a predetermined area in an unmovable manner, a previously-created MFP image registration table may be stored in a predetermined area (e.g., the storage unit 120) under control by the data management program 1208.

When the user begins to drag the mouse (i.e, to perform a drag operation of continuously issuing a selection instruction via the mouse) from an initial position on the display unit 130 specified by the pointer 750, the controller 110 acquires the initial position specified by the pointer 750 as a drag start position (S100). Then, the controller 110 determines whether the drag stall position is included in any of the areas 230A, 240A, and 260A, of which the positional information is registered on the MFP image registration table. Further, when the drag start position is included in any of the areas 230A, 240A, and 260A, the controller 110 determines in which area, among the areas 230A, 240A, and 260A, the drag start position is included (S102).

When determining that the drag start position is included in the scanning unit area 240A (S102: Scanning Unit), the controller 110 goes to S104. When determining that the drag start position is included in the facsimile unit area 260A (S102: Facsimile Unit), the controller 110 goes to S106. When determining that the drag start position is included in the medium drive area 230A (S102: Medium Drive), the controller 110 goes to S108. Meanwhile, when determining that the drag start position is not included in any of the areas 230A, 240A, and 260A (S102: Others), the controller 110 goes back to S100 without performing any particular operation. Then, the controller 110 again waits for the user to drag the mouse.

In S104, the controller 110 changes a display state of the scanning unit area 240A in the MFP image 200A (S104). For example, the controller 110 may display (a partial image included in) the scanning unit area 240A in an enlarged manner. Alternatively, the controller 110 may display (a partial image included in) the scanning unit area 240A with an increased brightness. Then, the controller 110 goes to S112.

In S106, the controller 110 changes a display state of the facsimile unit area 260A in the MFP image 200A (S106). For example, the controller 110 may display the facsimile unit area 260A in an enlarged manner. Alternatively, the controller 110 may display the facsimile unit area 260A with an increased brightness. Then, the controller 110 goes to S112.

In S108, the controller 110 changes a display state of the medium drive area 230A in the MFP image 200A (S108). For example, the controller 110 may display the medium drive area 230A in an enlarged manner. Alternatively, the controller 110 may display the medium drive area 230A with an increased brightness. Then, the controller 110 goes to S112.

In S104, S106, and S108, the controller 110 displays on the display unit 130 a data icon 760 near the pointer 750 (see FIG. 4) or instead of the pointer 750. The data icon 760 moves in response to a user operation of the mouse in the same manner as the pointer 750 (see an arrow "1" in FIG. 4). It is noted that in FIG. 4, the data icon 760 shown with a dashed line and the pointer 750 shown within the data icon 760 represents states of the data icon 760 and the pointer 750 before being moved. As illustrated in FIGS. 5A, 5B, and 5C, the data icon 760 is shown so that the user can discriminate the function of one of the medium drive 230, the scanning unit 240, and the facsimile unit 260 that corresponds to the drag start position.

The data icon 760 is for data related to one of the medium drive 230, the scanning unit 240, and the facsimile unit 260 that corresponds to the drag start position. For example, when the drag start position is included in the medium drive area 230A (S102: Medium Drive), the data icon 760 represents the image data 2302 stored on the memory card attached to the medium drive 230. In addition, when the drag start position is included in the scanning unit area 240A (S102: Scanning Unit), the data icon 760 represents the scanned data generated through a scanning operation by the scanning unit by that time. Further, when the drag start position is included in the facsimile unit area 260A (S102: Facsimile Unit), the data icon 760 represents the facsimile data 2202 stored on the storage unit 220.

When the user keeps dragging the mouse and ends the drag operation (by releasing the selection instruction continuously issued via the mouse) in a final position on the display unit 130 specified by pointer 750, the controller 110 acquires the final position specified by the pointer 750 as a drag end position (S112). Thereafter, the controller 110 goes to S114.

In S114, the controller 110 acquires positional information on display areas of the file management application screen 1204A and the edit application screen 1206A on the display unit 130, e.g., from the OS 1202, and registers the acquired positional information on the display areas onto a display area registration table (S114). The display area registration table is stored, e.g., in a predetermined area on the RAM or a predetermined area on the storage unit 120. Here, the controller 110 also registers the positional information on the display area of the MFP image 200A on the display unit 130 onto the display area registration table.

In S116, the controller 110 determines whether the drag end position is included in any of the respective areas of the file management application screen 1204A, the edit application screen 1206A, and the MFP image 200A, of which the positional information is registered on the display area registration table. Further, when the drag end position is included in any of the respective areas of the file management application screen 1204A, the edit application screen 1206A, and the MFP image 200A, the controller 110 determines in which area, among the respective areas of the file management application screen 1204A, the edit application screen 1206A, and the MFP image 200A, the drag end position is included (S116).

When determining that the drag end position is included in the area of the MFP image 200A (S116: MFP Image), the controller 110 goes to S118. When determining that the drag end position is included in the area of the file management application screen 1204A (S116: File Management Application), the controller 110 goes to S120. When determining that the drag end position is included in the area of the edit application screen 1206A (S116: Edit Application), the controller 110 goes to S122. Meanwhile, when determining that the drag end position is not included in any of the respective areas of the file management application screen 1204A, the edit application screen 1206A, and the MFP image 200A (S116: Others), the controller 110 cancels the data acquiring process based on the drag operation in S100 (S124), and goes back to S100. Then, the controller 110 again waits for the user to drag the mouse.

In S118, the controller 110 determines the printer driver 1210 as a destination to which the data represented by the data icon 760 is to be transmitted. Further, the controller 110 determines to convert the data represented by the data icon 760 into print data (S118). Thereafter, the controller 110 goes to S126.

In S120, the controller 110 determines the file management application 1204 as the destination to which the data represented by the data icon 760 is to be transmitted. Further, the controller 110 determines to convert the data represented by the data icon 760 into data of the Joint Photographic Experts Group (JPEG) format (S118). Alternatively, the controller 110 may determine to convert the data represented by the data icon 760 into data of the Tagged Image File Format (TIFF). Thereafter, the controller 110 goes to S126.

In S122, the controller 110 determines the edit application 1206 as the destination to which the data represented by the data icon 760 is to be transmitted. Further, the controller 110 determines to convert the data represented by the data icon 760 into text data through an optical character recognition (OCR) process (S122). Thereafter, the controller 110 goes to S126.

In S126, the controller 110 requests the MFP 200 to transmit the data (the image data 2302, the facsimile data 2202, or the scanned data) represented by the data icon 760. Further, the controller 110 receives the data (e.g., the data of the BMP format) transmitted by the MFP 200 in response to the request, and stores the received data into a predetermined work area secured on the RAM (S126). Specifically, the controller 110 stores the data onto a clipboard presented by the OS 1202 or into a work area under control by the data management program 1208. Then, the controller 110 goes to S128.

In S128, the controller 110 converts the data acquired in S126 into data of the format determined in any of S118, S120 and S122 (S128). Subsequently, the controller 110 transmits the data after the conversion to the destination determined in any of S118, S120 and S122 (S130).

For example, when the drag start position is included in the medium drive area 230A (S102: Medium Drive), and the drag end position is included in the area of the file management application screen 1204A (S116: File Management Application), the controller 110 acquires the image data 2302 from the MFP 200 (S126). Then, the controller 110 converts the image data 2302 into JPEG data in accordance with the determination in S120 (S128) and transmits the JPEG data to the file management application 1204 (S130). The controller 110 stores the JPEG data into a predetermined folder based on the file management application 1204. It is noted that the folder in which the JPEG data is stored may be selected based on various methods. For instance, when the drag end position is determined to be included in an area of a folder Q (see the file management application screen 1204A in FIG. 3) under management for areas (positions) of folders shown on the file management application screen 1204A, the JPEG data is stored in the folder Q.

Further, when the drag start position is included in the medium drive area 230A (S102: Medium Drive), and the drag end position is included in the MFP image 200A (S116: MFP Image), the controller 110 acquires the image data 2302 from the MFP 200 (S126). Then, the controller 110 converts the image data 2302 into print data in accordance with the determination in S118 (S128), and transmits the print data to the printer driver 1210 (S130). Thereafter, the controller 110 requests the MFP 200 to perform a printing operation, based on the printer driver 1210. It is noted that the controller 210 of the MFP 200 controls the printing unit 250 to perform the printing operation.

Further, when the drag start position is included in the scanning unit area 240A (S102: Scanning Unit), and the drag end position is included in the MFP image 200A (S116: MFP Image), the controller 110 acquires the scanned data from the MFP 200 (S126). Then, the controller 110 converts the scanned data into print data in accordance with the determination in S118 (S128), and transmits the print data to the printer driver 1210 (S130). Thereafter, the controller 110 requests the MFP 200 to perform a printing operation, based on the printer driver 1210. It is noted that the controller 210 of the MFP 200 controls the printing unit 250 to perform the printing operation. Thereby, the copy function can be attained.

Further, when the drag start position is included in the facsimile unit area 260A (S102: Facsimile Unit), and the drag end position is included in the area of the edit application screen 1206A (S116: Edit Application), the controller 110 acquires the facsimile data 2202 from the MFP 200 (S126). Then, the controller 110 converts the facsimile data 2202 into text data through the OCR process in accordance with the determination in S118 (S128), and transmits the text data to the edit application 1206 (S130). Thereafter, the controller 110 incorporates the text data into document data currently being edited, based on the edit application 1206.

Further, when the drag start position is included in the medium drive area 230A (S102: Medium Drive), and the drag end position is included in the area of the edit application screen 1206A (S116: Edit Application), the controller 110 acquires the image data 2302 from the MFP 200 (S126). Then, the controller 110 converts the image data 2302 into text data through the OCR process in accordance with the determination in S118 (S128), and transmits the text data to the edit application 1206 (S130).

Further, when the drag start position is included in the scanning unit area 240A (S102: Scanning Unit), and the drag end position is included in the area of the file management application screen 1204A (S116: File Management Application), the controller 110 acquires the scanned data from the MFP 200 (S126). Then, the controller 110 converts the scanned data into JPEG data in accordance with the determination in S118 (S128), and transmits the JPEG data to the file management application 1204 (S130).

Further, when the drag start position is included in the scanning unit area 240A (S102: Scanning Unit), and the drag end position is included in the area of the edit application screen 1206A (S116: Edit Application), the controller 110 acquires the scanned data from the MFP 200 (S126). Then, the controller 110 converts the scanned data into text data in accordance with the determination in S118 (S128), and transmits the text data to the edit application 1204 (S130).

Further, when the drag start position is included in the facsimile unit area 260A (S102: Facsimile Unit), and the drag end position is included in the MFP image 200A (S116: MFP Image), the controller 110 acquires the facsimile data from the MFP 200 (S126). Then, the controller 110 converts the facsimile data into print data in accordance with the determination in S118 (S128), and transmits the print data to the printer driver 1210 (S130).

Further, when the drag start position is included in the facsimile unit area 260A (S102: Facsimile Unit), and the drag end position is included in the area of the file management application screen 1204A (S116: File Management Application), the controller 110 acquires the facsimile data from the MFP 200 (S126). Then, the controller 110 converts the facsimile data into JPEG data in accordance with the determination in S118 (S128), and transmits the JPEG data to the file management application 1204 (S130).

After that, the controller 110 determines whether the user has input a command to terminate the data acquiring process via the operation unit 140 (S132). When determining that the user has input the command to terminate the data acquiring process via the operation unit 140 (S132: Yes), the controller 110 terminates the data acquiring process. Meanwhile, when determining that the user has not input the command to terminate the data acquiring process via the operation unit 140 (S132: No), the controller 110 goes back to S100, in which the controller 110 again waits for the user to drag the mouse.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein.

For example, in the above-described processes, one or more steps may be omitted as needed. Furthermore, the following modifications are possible.

In the aforementioned embodiment, the PC 100 and the MFP 200 are connected with each other via the LAN 400. The LAN connection may be established in a wired manner or a wireless manner (an infrastructure mode or an ad hoc mode). Further, the connection between the PC 100 and the MFP 200 may be established based on a Universal Serial Bus (USB) connection, infrared data communication, or a Wireless USB connection.

In the aforementioned embodiment, when the drag start position is in the scanning unit area 240A (S102: Scanning Unit), the controller 110 displays (a partial image included in) the scanning unit area 240A in an enlarged manner or with an increased brightness. However, the controller 110 may display (a partial image included in) the scanning unit area 240A in other manners. The controller 110 may display a moving image to show that the scanning unit 240 is currently operating or that the scanning unit 240 is shifting to an operating state. For instance, the controller 110 may display (a partial image included in) the scanning unit area 240A in such a manner that a document cover above the document table is repeatedly opened and closed.

In addition, when the drag start position is in the facsimile unit area 260A (S102: Facsimile Unit), the controller 110 displays (a partial image included in) the facsimile unit area 260A in such a manner that the numerical keypad of the operation unit 280 is repeatedly operated.

Further, when the drag start position is in the medium drive area 230A (S102: Medium Drive), the controller 110 displays (a partial image included in) the medium drive area 230A in such a manner that a memory card is repeatedly attached to and detached from the medium drive 230.

In the data acquiring process (see FIG. 2) of the aforementioned embodiment, the determination in S102 is made using the MFP image registration table, and the determination in S116 is made using the display area registration table. The positional information on each display area registered on each of the registration tables may be registered (stored) not necessarily on any registration table, but in an alternative manner. For instance, the positional information on each display area registered on each of the registration tables may be registered in an execution file of the data management program 1208.

In the aforementioned embodiment, when the drag end position is included in the area of the MFP image 200A (S116: MFP Image), the controller 110 acquires, from the MFP 200, predetermined data (the image data 2302, the facsimile data 2202, or the scanned data) represented by the data icon 760 (S126), converts the data into print data (S128), transmits the print data to the printer driver 1210 (S130), and requests the MFP 200 to perform a printing operation based on the print data, via the printer driver 1210.

However, when the drag end position is included in the area of the MFP image 200A (S116: MFP Image), the controller 110 may transmit to the MFP 200 a print command that instructs to perform a printing operation based on predetermined data represented by the data icon 760. In this case, the controller 210 of the MFP 200, which has received the print command, performs a printing operation based on the data (the scanned data, the facsimile data 2202, or the image data 2302) specified by the print command, using the printing unit 250.

In the aforementioned embodiment, the destination to which the data represented by the data icon 760 is to be transmitted is determined based on where the drag end position is (among the MFP image 200A, the area of the file management application screen 1204A, the area of the edit application screen 1206A, and other areas) (see S116 in FIG. 2). However, for example, the following configuration, which will be described with reference to FIG. 6, may be applied.

Each of process icons 800A to 800E shown in FIG. 6 is an alternative element corresponding to a file management application of the file management application screen 1204A or an edit application of the edit application screen 1206A in the aforementioned embodiment. Each of the process icons 800A to 800E is associated with any of the computer programs installed in the storage unit 120 (that include programs and applications other than the programs 1204, 1206, 1208, and 1210). It is noted that each element in FIG. 6, which is configured in the same manner as the aforementioned embodiment, has the same reference characters attached thereto as the aforementioned embodiment.

When the user begins to drag the mouse from a drag start position (see S100, S102: Scanning Unit, Facsimile Unit, or Medium Drive, in FIG. 2) and ends the drag operation in a drag end position (see S112 in FIG. 2), the controller 110 determines where the drag end position is, based on a display area registration table on which positional information on respective display areas of the process icons 800A to 800E is registered (see S114 in FIG. 2). Then, the controller 110 performs a process associated with each of the process icons 800A to 800E (see S118 to S124 and S126 to S128 in FIG. 2).

For example, when the drag end position is in the area of the process icon 800B, in determination corresponding to S116 in FIG. 2, the controller 110 determines the file management application 1204 (associated with the process icon 800B) as a destination to which data represented by the data icon 760 is to be transmitted, and determines to convert the data into JPEG data. Then, the controller 110 acquires the data represented by the data icon 760 from the MFP 200 (see S126 in FIG. 2), converts the acquired data into JPEG data (see S128 in FIG. 2), and transmits the JPEG data to the file management application 1204 (S130). Thereafter, the controller 110 stores the JPEG data, e.g., into a root folder (see the file management application screen 1204A in FIG. 3).

Further, when the drag end position is determined to be in the area of any of the process icons 800A, and 800C to 800E, a corresponding process is performed in the same manner as the case where the drag end position is in the area of the process icon 800B (a detailed explanation will be omitted about that). Further, when the drag end position is determined to be in the MFP image 200A, the same process as the data acquiring process (see FIG. 2) is executed.

What is claimed is:

1. A data management device configured to manage data generated or stored in an external device that comprises functional units each configured to execute a corresponding one of multiple functions of the external device and generate or store data using the corresponding function, the data management device comprising:

a display unit configured to display, on a display screen thereof, an external-device image representing the external device and an application screen corresponding to each of applications in execution on the data management device, the external-device image comprising function areas that respectively represent the functional units;

a function area positional information storing unit configured to store function area positional information corresponding to a position of each of the function areas on the display screen;

a display area positional information storing unit configured to store display area positional information corresponding to a position of each of respective display areas for the external-device image and the application screens on the display screen;

a first position setting unit configured to set an earlier-specified position on the display screen as a first position;

a first determining unit configured to determine whether the first position set by the first position setting unit is included in a specific one of the function areas, based on the function area positional information stored in the function area positional information storing unit;

an identification image display unit configured to, when the first determining unit determines that the first position set by the first position setting unit is included in a specific one of the function areas, display an identification image for identifying a function corresponding to the specific function area determined to include the first position;

a second position setting unit configured to set, as a second position, a later-specified position, on the display screen, specified in response to a user operation of moving the identification image displayed by the identification image display unit after the identification image display unit displays the identification image for identifying the function corresponding to the specific function area determined to include the first position;

a second determining unit configured to determine whether the second position set by the second position setting unit is included in a specific one of the display areas, based on the display area positional information stored in the display area positional information storing unit; and a data setting unit configured to, when the second determining unit determines that the second position set by the second position setting unit is included in a specific one of the display areas, set data generated or stored in the external device using the function corresponding to the specific function area determined to include the first position, as target data to be processed by one of an application and the external device corresponding to the specific display area determined to include the second position.

2. The data management device according to claim 1, further comprising:

an operation unit configured to, when operated, move a pointer on the display screen, wherein the first position setting unit is configured to set, as the first position, a position specified by the pointer on the display screen through the operation unit, and the second position setting unit is configured to set, as the second position, a position specified by the pointer on the display screen through the operation unit; and a display controller configured to control the display unit to display, on the display screen, a data image that follows the pointer moving, the data image representing that data, which corresponds to a function represented by the function area in which the first position is included, is to be set by the setting unit.

3. The data management device according to claim 1, further comprising a display state changing unit configured to change a display state of the function area in which the first position is included.

4. The data management device according to claim 3, wherein the display state changing unit is configured to change the display state of the function area in which the first position is included, such that at least part of the function area is displayed in an enlarged manner.

5. The data management device according to claim 3, wherein the display state changing unit is configured to change the display state of the function area in which the first position is included, such that at least part of the function area is displayed with an increased brightness.

6. The data management device according to claim 1, wherein the external-device image comprises function areas that represent a scanning unit, a facsimile unit, and a medium drive of the external device, respectively.

7. The data management device according to claim 1, wherein the applications to be executed by the data management device comprise a file management application and an edit application.

8. A data management method adapted to be implemented on a processor to manage data generated or stored in an external device that comprises functional units each configured to execute a corresponding one of multiple functions of the external device and generate or stores data using the corresponding function, the data management method comprising:

a display step of displaying, on a display screen of the processor, an external-device image representing the external device and an application screen corresponding to each of applications in execution on the processor, the external-device image comprising function areas that respectively represent the functional units;

a function area positional information storing step of storing function area positional information corresponding to a position of each of the function areas on the display screen;

a display area positional information storing step of storing display area positional information corresponding to a position of each of respective display areas for the external-device image and the application screens on the display screen;

a first position setting step of setting an earlier-specified position the display screen as a first position;

a first determining step of determining whether the first position set by the first position setting unit is included in a specific one of the function areas, based on the function area positional information stored in the function area positional information storing unit;

an identification image display step of displaying, when the first determining unit determines that the first position set by the first position setting unit is included in a specific one of the function areas, an identification image for identifying a function corresponding to the specific function area determined to include the first position;

a second position setting step of setting, as a second position, a later-specified position, on the display screen, specified in response to a user operation of moving the identification image displayed by the identification image display unit after the identification image display unit displays the identification image for identifying the function corresponding to the specific function area determined to include the first position;

a second determining step of determining whether the second position set by the second position setting unit is included in a specific one of the display areas, based on the display area positional information stored in the display area positional information storing unit; and a data setting step of setting data, when the second determining unit determines that the second position set by the second position setting unit is included in a specific one of the display areas, generated or stored in the external device using the function corresponding to the specific function area determined to include the first position, as target data to be processed by one of an application and the external device corresponding to the specific display area determined to include the second position.

9. A non-transitory computer readable medium storing computer readable instructions for managing data generated or stored in an external device that comprises functional units each configured to execute a corresponding one of multiple functions of the external device and generate or stores data using the corresponding function, the instructions, when executed by a processor, causing the processor to perform: a display step of displaying, on a display screen of the processor, an external-device image representing the external device and an application screen corresponding to each of applications in execution on the processor, the external-device image comprising function areas that respectively represent the functional units; a function area positional information storing step of storing function area positional information corresponding to a position of each of the function areas on the display screen; a display area positional information storing step of storing display area positional information corresponding to a position of each of respective display areas for the external-device image and the application screens on the display screen; a first position setting step of setting an earlier-specified position on the display screen as a first position;

a first determining step of determining whether the first position set by the first position setting unit is included in a specific one of the function areas, based on the function area positional information stored in the function area positional information storing unit; an identification image display step of displaying, when the first determining unit determines that the first position set by the first position setting unit is included in a specific one of the function areas, an identification image for identifying a function corresponding to the specific function area determined to include the first position; a second position setting step of setting, as a second position, a later-specified position, position later specified on the display screen, specified in response to a user operation of moving the identification image displayed by the identification image display unit after the identification image display unit displays the identification image for identifying the function corresponding to the specific function area determined to include the first position; a second determining step of determining whether the second position set by the second position setting unit is included in a specific one of the display areas, based on the display area positional information stored in the display area positional information storing unit; and a data setting step of setting data, when the second determining unit determines that the second position set by the second position setting unit is included in a specific one of the display areas, generated or stored in the external device using the function corresponding to the specific function area determined to include the first position, corresponding to a function represented by one, of the function areas, in which the first position is determined to be included, as target data to be processed by one of an application and the external device corresponding to the specific display area determined to include the second position in a process corresponding to one, of the display areas, in which the second position is determined to be included.

10. The non-transitory computer readable medium according to claim 9, wherein the processor comprises an operation unit configured to, when operated, move a pointer on the display screen, wherein the first position setting step comprises a step of setting, as the first position, a position specified by the pointer on the display screen through the operation unit, wherein the second position setting step comprises a step of setting, as the second position, a position specified by the pointer on the display screen through the operation unit, and wherein the instructions cause the processor to further perform a second display step of displaying, on the display screen, a data image that follows the pointer moving, data image representing that data, which corresponds to a function represented by the function area in which the first position is included, is to be set in the setting step.

11. The non-transitory computer readable medium according to claim 9, wherein the instructions cause the processor to further perform a display state changing step of changing a display state of the function area in which the first position is included.

12. The non-transitory computer readable medium according to claim 11, wherein the display state changing step comprises a step of changing the display state of the function area in which the first position is included, such that at least part of the function area is displayed in an enlarged manner.

13. The non-transitory computer readable medium according to claim 11, wherein the display state changing step comprises a step of changing the display state of the function area in which the first position is included, such that at least part of the function area is displayed with an increased brightness.

14. The non-transitory computer readable medium according to claim 9, wherein the external-device image comprises function areas that represent a scanning unit, a facsimile unit, and a medium drive of the external device, respectively.

15. The non-transitory computer readable medium according to claim 9, wherein the applications to be executed by the processor comprise a file management application and an edit application.

16. The data management device according to claim 1,
wherein the first position setting unit is further configured to set, as the first position, the earlier-specified position, on the display screen, specified in response to a user operation of moving a movable image,
wherein the identification image display unit is further configured to, when the first determining unit determines that the first position set by the first position setting unit is included in a specific one of the function areas, display, as the movable image, the identification image for identifying the function corresponding to the specific function area determined to include the first position,
wherein the second position setting unit is further configured to set, as the second position, the later-specified position, on the display screen, specified in response to a user operation of moving the movable image displayed by the identification image display unit after the identification image display unit displays, as the movable image, the identification image for identifying the function corresponding to the specific function area determined to include the first position.

17. The data management device according to claim 1,
wherein the first position setting unit is further configured to set, as the first position, the earlier-specified position, on the display screen, where a pointer exists when a user operation is performed of moving a movable image including the pointer to specify the first position,
wherein the identification image display unit is further configured to, when the first determining unit determines that the first position set by the first position setting unit is included in a specific one of the function areas, display, as the movable image, an image including the pointer and information for identifying the function corresponding to the specific function area determined to include the first position,
wherein the second position setting unit is further configured to set, as the second position, the later-specified position, on the display screen, where the pointer exists when a user operation is performed of moving the movable image displayed by the identification image display unit after the identification image display unit displays, as the movable image, the image including the pointer and the information for identifying the function corresponding to the specific function area determined to include the first position.

18. The data management device according to claim 17,
wherein the information for identifying the function corresponding to the specific function area determined to include the first position comprises a character string for identifying the function corresponding to the specific function area determined to include the first position.

19. The data management device according to claim 1, further comprising:
a data acquiring unit configured to, when the data setting unit sets the target data, acquire the data generated or stored in the external device using the function corresponding to the specific function area determined to include the first position; and a processing instructing unit configured to instruct the one of the application and the external device corresponding to the specific display area determined to include the second position to process the data acquired by the data acquiring unit.

20. The data management device according to claim 1, wherein the first position setting unit is further configured to set, as the first position, the earlier-specified position, on the display screen, specified by a user operation,
wherein the data management device further comprises a display state changing unit configured to, when the first determining unit determines that the first position set by the first position setting unit is included in a specific one of the function areas, change a display state of the specific function area determined to include the first position, and
wherein the second position setting unit is further configured to set, as the second position, the later-specified position, on the display screen, specified by a user operation after the display state changing unit changes the display state of the specific function area determined to include the first position.

21. The data management device according to claim 20, wherein the display state changing unit is further configured to, when the first determining unit determines that the first position set by the first position setting unit is included in a specific one of the function areas, change the display state of the specific function area determined to include the first position to a state where the specific function area is displayed in an enlarged manner.

22. The data management device according to claim 20, wherein the display state changing unit is further configured to, when the first determining unit determines that the first position set by the first position setting unit is included in a specific one of the function areas, change the display state of the specific function area determined to include the first position to a state where the specific function area is displayed with an increased brightness.

23. The data management device according to claim 20, wherein the display state changing unit is further configured to, when the first determining unit determines that the first position set by the first position setting unit is included in a specific one of the function areas, change the display state of the specific function area determined to include the first position to a state where the specific function area is displayed as a moving image.

24. The data management device according to claim 1, wherein the data management device further comprises:
a data acquiring unit configured to acquire the data generated or stored in the external device using the function corresponding to the specific function area determined to include the first position;
a data format acquiring unit configured to, when the data setting unit sets the target data, acquire a data format required for processing the target data by the one of an application and the external device corresponding to the specific display area determined to include the second position;
a data format converting unit configured to, when the data format acquiring unit acquires the data format required for processing the target data by the one of an application and the external device corresponding to the specific display area determined to include the second position, convert the data acquired by the data acquiring unit into data of the data format acquired by the data format acquiring unit; and
a processing instructing unit configured to instruct the one of the application and the external device corresponding to the specific display area determined to include the second position to process the data into which the data format converting unit has converted the data acquired by the data acquiring unit.

25. The data management device according to claim 1, wherein the user operation of moving the identification image comprises dragging the identification image from the first position to the second position.

26. The data management method according to claim 8, wherein the user operation of moving the identification image comprises dragging the identification image from the first position to the second position.

27. The non-transitory computer readable medium according to claim 9, wherein the user operation of moving the identification image comprises dragging the identification image from the first position to the second position.

* * * * *